Patented Dec. 26, 1944

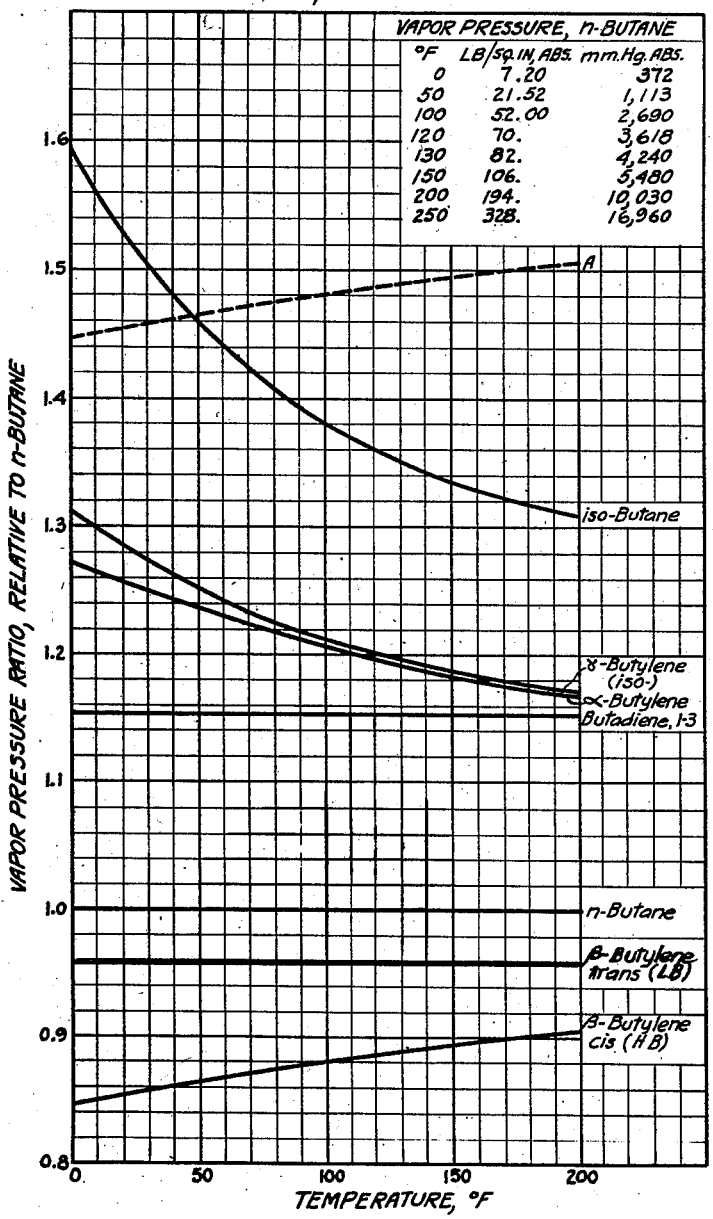

2,365,912

UNITED STATES PATENT OFFICE 2,365,912

DISTILLATION PROCESS

Mott Souders, Jr., Piedmont, Calif., assignor to Shell Development Company, San Francisco, Calif., a corporation of Delaware Application August 14, 1942, Serial No. 454,879

7 Claims. (Cl. 202—52)

This invention relates to the separation of organic compounds and more particularly pertains to a practical and economical method for effecting the separation of organic compounds having closely related boiling points which are consequently difficult to separate by ordinary fractional distillation.

In the treatment, for example, of cracked petroleum distillates it is relatively easy by ordinary fractional distillation to obtain fractions which predominate in hydrocarbons containing the same number of carbon atoms. However, separation of these fractions into their components by simple distillation, while theoretically possible, presents almost insurmountable practical difficulties. This is due, of course, to the very slight difference existing between the boiling points of the components of such mixtures.

Various methods have been proposed for effecting the separation or purification of organic mixtures, the components of which are difficult to separate by simple distillation. Of these methods the most commercially feasible are those which involve distilling the mixture to be separated in the presence of a relatively higher boiling solvent which is selective for a component thereof. These processes may be collectively referred to as extractive distillation processes. While susceptible to some variation, processes of this type are in general executed by causing the solvent to flow down the distillation column as the distillation proceeds and as vapors ascend from the kettle at the bottom of the column. Thus the solvent scrubs the vapors in a first zone, selectively dissolving the more soluble component and the resulting fat solvent is partially stripped in a second zone by vapor fresh from the distillation kettle, having a higher temperature than the vapor in the first zone. As in ordinary distillation a portion of the overhead product or products is returned to the column after condensation as reflux, the reflux inlet being positioned several plates above the solvent feed port. The component dissolved by the solvent may be removed therefrom by distillation or any other suitable means to produce a lean solvent which may be recirculated.

Extractive distillation processes are often executed in a continuous manner, the mixture to be separated being continuously introduced into the column at a point below the solvent feed. Frequently, in continuous operation it is the practice in lieu of heating the solution of the extracted component at the base of the column to supply the vapor to partially strip the descending fat solvent, to divert a portion of the overhead vapor produced during regeneration of the solvent to the base of the distillation column. Under this method of operation it is not essential that the distillation column be provided with a heat source. In effect the vapor supplied to partially strip the descending fat solvent, whether provided by heating the fat solvent at the bottom of the column or by diverting a part of the overhead during regeneration of the solvent, constitutes what may be properly termed a "bottom reflux."

As heretofore carried out, extractive distillation processes have required the expenditure of large amounts of fuel and cooling water by reason of the high reflux rates necessary to meet product specifications. The use of a much greater proportion of solvent to feed material than that most economically desirable is also frequently necessary.

A principal object of the present invention, therefore, is to provide an efficient and easily-executed extractive distillation process for separating organic mixtures of narrow boiling range containing two or more components of the same or different degrees of saturation, which is characterized by low utility and solvent consumption. A further object of the invention is to increase column through-put, or production capacity.

It has now been found that the foregoing and other objects may be achieved by conducting the distillation at a pressure at which the volatility ratio of the components to be separated is most favorable to their separation. More specifically, it has been discovered that in the separation of organic mixtures of narrow boiling range by extractive distillation superior results are obtained by carrying out the distillation either at a reduced pressure with a solvent selective for the higher boiling of the components to be separated or at a superatmospheric pressure with a solvent which inverts the normal volatility relationship between the components to be separated.

It is well known that the ease of separation of the components of a mixture by a distillation process depends upon the relative volatility of the components. Relative volatility is defined for a simple two component system in the presence of a higher boiling selective solvent as follows:

$$\alpha = \frac{P_1}{X_1} \Big/ \frac{P_2}{X_2}$$

wherein
  $\alpha$ = relative volatility
  $P_1$ = partial pressure of first component
  $P_2$ = partial pressure of second component
  $X_1$ = mol fraction of the first component in the total liquid including the selective solvent.

$X_2$ = mol fraction of the second component in the total liquid including the selective solvent.

When a mixture of narrow boiling range, which by ordinary fractionation is relatively more difficult to separate at elevated pressures than at reduced pressures, is extractively distilled according to the teachings of the present invention, the $\alpha$ value or volatility ratio of the components is substantially increased over that obtaining when the mixture is extractively distilled without regard to the influence of the operating pressure on the $\alpha$ value as heretofore, and separation is greatly facilitated.

While generally applicable to the separation of mixtures of organic compounds, the present process is most conveniently explained with reference to a single narrow boiling hydrocarbon fraction such, for example, as a fraction predominating in hydrocarbons of four carbon atoms. In this connection introduction will now be made of the accompanying drawing which represents the effect of temperature expressed in degrees Fahrenheit on the vapor pressures of the various four carbon atom hydrocarbons and their vapor pressure ratios relative to normal butane taken as unity. Presented with the drawing is a table, giving the vapor pressure of normal butane in pounds per square inch and in millimeters of mercury absolute at various temperatures. The vapor pressure at any one of these temperatures of any of the other hydrocarbons encompassed by the drawing can be easily determined by multiplying the vapor pressure of normal butane at the temperature by the relative volatility of the other hydrocarbon to normal butane at the same temperature.

The effect of pressure on the relative ease of separation of a $C_4$ hydrocarbon fraction by ordinary fractional distillation is well illustrated by the drawing from which the effect of operating according to the teachings of the present invention is also easily visualized. Take, for example, a mixture comprising butadiene (B. P. $-4.5°$ C.) and cis beta butylene (B. P. $+3.73°$ C.) from which it is desired to separate the butadiene in as pure a state as possible. The cis beta butylene relative vapor pressure curve will be noted as converging toward the horizontal line, representing the relative vapor pressure of butadiene, as the pressure increases. This convergence, of course, means, as is shown by the graph, a decrease in the volatility ratio of these two components at the higher pressures which renders their separation by ordinary fractionation increasingly difficult at these pressures. Now, when the cis beta butylene-butadiene containing mixture is distilled in the presence of a solvent selective for butadiene and capable of causing the normally higher boiling beta butylene to go overhead, the effect is shown by the dotted line A. Dotted line A, instead of tending to converge with the butadiene line as the pressure increases, diverges therefrom. Hence, the relative volatility of cis beta butylene and butadiene, which is a direct measure of the ease with which they may be separated by a distillation process, is greatest, in the presence of a solvent selective for butadiene, at the more elevated pressures. This accounts for the improved results obtainable by the present process as executed with a solvent selective for the lower boiling component.

An extractive distillation, as executed with a solvent selective for the higher boiling component of a hydrocarbon mixture, which becomes increasingly more difficult to separate by ordinary fractionation as the pressure is increased, is conducted at a reduced pressure according to the invention. It has been found, when a solvent is employed which is selective for the higher boiling component of such a mixture, that the normally existing volatility relationship between the components is not only preserved in the sense that the lower boiling component of the mixture is recovered as overhead but also in the sense that, except for the increase in the spread between the effective distillation temperatures of the components resulting from the use of the selective solvent, the vapor pressures of the components maintain essentially the same relationship as when the distillation is conducted in the absence of an auxiliary agent. In other words the vapor pressure curves for the components when plotted as log p. vs. temp. still tend to converge as the pressure increases. Thus, by operating at a reduced pressure when a solvent is employed which is selective for the higher boiling component, for example, in a mixture of cis beta butylene and butadiene, a much higher degree of separation may be attained than is otherwise possible. In this instance the butadiene is recovered as overhead during the extractive distillation rather than upon regeneration of the solvent as is the case when a solvent is employed which inverts the normal volatility relationship of the two hydrocarbons.

Other separations which may be carried out advantageously according to the invention as indicated by the drawing include: normal butane from iso and/or alpha butylene, isobutylene from alpha butylene, normal butane from beta butylene, butadiene from alpha butylene, beta butylene from alpha and/or iso butylene, etc.

It is to be understood that any of these separations may be effected in the presence of other hydrocarbons including other hydrocarbons of four carbon atoms. The other hydrocarbons may be either higher or lower boiling. Hence in the foregoing and hereinafter when reference is made to a solvent as selective for the higher boiling component or as selective for the lower boiling component, this refers only to the relationship between the components to be separated and does not exclude the presence of other hydrocarbons.

It is also to be clearly understood that in the separation of the above mixtures either of the two methods within the scope of the invention may be employed. In general, it is preferred to execute the distillation with a solvent selective for the normally lower boiling component, since at the higher pressures the necessity for the refrigeration of the stillhead is avoided. However, in certain cases it may be more economical, despite the necessity for refrigeration as with ammonia or sulfur dioxide, to operate at a reduced pressure. The optimum method for a given operation may be easily determined in the laboratory by means of small-scale test runs.

The present invention may be practically applied in several ways. With an extractive distillation column which is being operated at atmospheric pressure to separate a mixture of normal butane and isobutylene, using a solvent which is selective for the iso-olefin, by elevating the pressure to five atmospheres according to the invention, products of a much higher purity are obtained without increasing the reflux rate and, at the same time, column production capacity is materially improved. In the distillation of an n-butane/isobutylene mixture, column production may also be increased without lessening product purity by operation at a reduced pressure, using a solvent in which normal butane is relatively more soluble than the isobutylene. This follows since the reflux rate necessary at atmospheric pressure is greatly reduced. When in an extractive distillation the most effective solvent is a relatively costly item, it may be advantageous to utilize the present invention by reducing the solvent rate, i. e. the proportion of solvent to feed material.

The present invention is not to be restricted to the separation of hydrocarbon mixtures consisting of components having four carbon atoms as it is generally applicable to the separation of organic compounds difficultly separable by ordinary fractionation. A mixture which is subjected to an extractive distillation according to the invention may consist of or comprise carbocyclic as well as acyclic components. The separation may be between components of different degrees of saturation as diolefins from mono-olefins, olefins from paraffins, naphthenes from paraffins, etc. or between components of the same degree of saturation as isomeric mono-olefins.

In the execution of the process the mixture to be separated may be introduced into the still as a liquid or in the form of vapor, but as a rule it is preferred to operate in a continuous manner with a vapor feed.

When the distillation is to be conducted at a superatmospheric pressure, it is preferred to operate at a pressure of from about 4 to about 8 atmospheres. However, pressures of any practical magnitude may be used. It is important to note that the temperatures necessary to attain a pressure higher than six atmospheres may cause a portion of the unsaturated components of the mixture, if any, to polymerize. Thus, the apparent advantage gained through the still further increase in $\alpha$ value may be offset by loss of products through polymerization. Also, in some cases, as for example, in the separation of isobutylene and alpha butylene with a solvent selective for the latter, no increase in $\alpha$ value may result from operating at a pressure of greater magnitude than the preferred range.

Due to the difficulties incident to the maintenance of a high vacuum in large scale operation, it is preferred, when operating with a solvent selective for the higher boiling component, to conduct the distillation at a reduced pressure which is not substantially less than about 200 millimeters absolute. The desired subatmospheric pressure may be obtained in any suitable manner, for example, by means of a vacuum pump or a single or multiple stage steam ejector system.

The solvents applicable to the present process may be broadly classified as polar and non-polar substances. The solvent should be higher boiling than the components of the mixture to be separated and should be thermally stable. A solvent with an excessively high boiling point should be avoided, however, since this increases the heat requirements, and consequently the cost during regeneration of the solvent. Also, it is advisable to select a solvent which does not form a constant boiling mixture with any of the hydrocarbons present in the mixture. It is preferable to employ a solvent which increases the spread between the effective distillation temperatures of the components of the particular mixture being subjected to treatment by at least 9 or 10° C. This is true whether or not the normal volatility relationship of the components to be separated is inverted.

A non-polar solvent, e. g. gasoline, kerosene, gas oil, benzene, lubricating oil, ether, trichlorethylene, carbon tetrachloride, etc., is employed where the hydrocarbon to be extracted is more saturated than the other component or components, while a polar solvent is used in the extraction of olefins, including diolefins, from paraffins, in the separation of diolefins from mono-olefins, and in the separation of isomeric mono-olefins. As between a straight and a branched chain olefin, each having the same number of carbon atoms and wherein the double bond is in the same position, e. g. alpha butylene and isobutylene, it should be remembered that polar solvents have greater selectivity for the branched chain olefin. On the other hand, where the double bond is not in the same position, e. g. $\alpha$ butylene and beta butylenes, a polar solvent has greater selectivity for the higher boiling component.

Suitable polar solvents for use in the execution of the invention include: phenol, cresylic acids, alkyl phenol mixtures, aniline, alkyl anilines, diphenylamine, ditolylamines; carbitols (diethylene glycol mono ethers) such as methyl, ethyl, propyl carbitols; chlorinated dialkyl ethers such as beta-beta-dichlorethyl ether; nitrobenzene; nitrotoluene, nitroxylenes; naphthols, alkyl naphthols, benzophenone, phenyl tolyl ketone, diphenylene ketone; alkyl phthalates, such as dimethyl phthalate; alkyl salicylates such as methyl salicylate; benzyl alcohol, benz chlorides, i. e. benzyl, benzal, benzo chlorides; benzonitrile, diphenyl oxide, ditolyl oxide, hydroxy pyridine, nitropyridine, chlorinated pyridines, quinoline, isoquinoline, chlorinated quinoline, hydroxy quinolines, 5-nitro quinoline, tetra hydro furfuryl alcohol, furfuryl alcohol, furfural, the mono glycerol ethers such as 1-methoxy glycerol, 2-methoxy glycerol, 1-ethoxy glycerol, 2-ethoxy glycerol, 1-propoxy glycerol, 2-propoxy glycerol, 1 - isopropoxy glycerol, 2 - isopropoxy glycerol; the glycerol di-ethers, such as 1,2-dimethoxy glycerol, 1,3-dimethoxy glycerol, 1,2-diethoxy glycerol, 1,3-diethoxy glycerol, 1,2-dipropoxy glycerol, 1,3-dipropoxy glycerol, 1,2-diisopropoxy glycerol, and 1,3-di-isopropoxy glycerol; the mixed diglycerol ether esters, such as 1-ethoxy, 2-methoxy glycerol, 1-methoxy, 3-propoxy glycerol, 1-ethoxy, 2-isopropoxy glycerol; antimony trichloride; various sulfones, etc.

It is frequently advantageous, as disclosed in the copending application, Serial No. 332,366, filed April 29, 1940, when operating with a polar solvent to increase the selectivity thereof by the addition of water thereto. These water-modified solvents have greatly increased selectivity for olefins over paraffins, and are also advantageous for use where the problem is one of separating a diolefin from admixture with one or more mono-olefins. Where a water-modified solvent is employed in a distillation at an elevated pressure, a greater quantity of water may be used than at atmospheric or at a reduced pressure, and the solvent thereby made still more selective. This follows because of the increase in the absolute solubility of the components of the mixture in the aqueous solvent at superatmospheric pressures. In no case, however, is it desirable to operate with such an excess of water as to cause the formation of two liquid phases in the column. The formation of two phases in the column is also to be avoided when operating with nonaqueous solvents, as this lowers the plate efficiency and generally complicates the system.

As disclosed in the above-identified patent application, Serial No. 332,366, polar solvents which are especially improved by the addition of water thereto include: acetone, methyl ethyl ketone, morpholine, dioxane, lactonitrile, and acetonitrile. These solvents, as modified through the addition of water, are particularly valuable in the separation of hydrocarbon mixtures predominating in hydrocarbons of four carbon atoms.

I claim as my invention:

1. A process for separating normal butane and a beta butylene, which comprises subjecting a hydrocarbon mixture containing normal butane and a beta butylene to a fractional distillation at a pressure substantially below atmospheric pressure, but above 200 mm. absolute in the presence of a non-polar solvent selective for the beta butylene and boiling substantially higher than said hydrocarbon mixture.

2. A process for separating butadiene and cis beta butylene, which comprises subjecting a hydrocarbon mixture containing butadiene and cis beta butylene to a fractional distillation at a pressure substantially below atmospheric pressure, but above about 200 mm. absolute in the presence of a non-polar solvent selective for said beta butylene and boiling substantially higher than said hydrocarbon mixture.

3. A process for separating normal butane from cis beta butylene, which comprises subjecting a mixture containing normal butane and cis beta butylene to a fractional distillation at a pressure substantially below atmospheric pressure, but above 200 mm. absolute in the presence of a non-polar solvent selective for the beta butylene and boiling substantially higher than said hydrocarbon mixture.

4. A process for separating isobutane and a butylene, which comprises subjecting a mixture containing isobutane and a butylene to a fractional distillation at a pressure substantially below atmospheric pressure, but above about 200 mm. absolute in the presence of a polar solvent selective for said butylene and boiling substantially higher than said hydrocarbon mixture.

5. A process for separating butadiene and a butylene, which comprises subjecting a hydrocarbon mixture containing butadiene and a butylene to a fractional distillation at a pressure substantially below atmospheric pressure, but above about 200 mm. absolute in the presence of a solvent selective for the higher-boiling of the two components and which solvent boils substantially higher than said components.

6. A process for effecting the separation of two components of hydrocarbons of four carbon atoms and different degrees of saturation which are difficult to separate by ordinary distillation which comprises distilling said components at a pressure substantially below atmospheric pressure, but above about 200 mm. absolute in the presence of a solvent selective for the higher-boiling of the two components, said solvent boiling substantially higher than said components.

7. A process for effecting the separation of two components of different degrees of unsaturation of a hydrocarbon mixture which have close boiling points so as to be difficult to separate by ordinary distillation which comprises distilling said components in the presence of a solvent which is selective for the higher boiling of the two components and which boils substantially higher than said components, said distillation being effected under a pressure which is substantially less than atmospheric pressure.

MOTT SOUDERS, JR.